(12) United States Patent
Caveney et al.

(10) Patent No.: US 8,217,266 B2
(45) Date of Patent: Jul. 10, 2012

(54) RAIL WIRING DUCT

(75) Inventors: Jack E. Caveney, Hinsdale, IL (US);
Fred L. Dorman, Plainfield, IL (US);
Michael R. Stabrawa, Frankfort, IL
(US); Jeff K. Groff, South Holland, IL
(US)

(73) Assignee: Panduit Corp., Tinley Park, IL (US)

( * ) Notice: Subject to any disclaimer, the term of this patent is extended or adjusted under 35 U.S.C. 154(b) by 684 days.

(21) Appl. No.: 12/367,922

(22) Filed: Feb. 9, 2009

(65) Prior Publication Data
US 2009/0200057 A1 Aug. 13, 2009

Related U.S. Application Data

(60) Provisional application No. 61/027,965, filed on Feb. 12, 2008.

(51) Int. Cl.
*H02G 3/06* (2006.01)
*H02G 3/04* (2006.01)

(52) U.S. Cl. ..... 174/88 R; 174/95; 174/72 A; 174/70 C; 174/72 C

(58) Field of Classification Search ................ 174/68.1, 174/68.3, 101, 70 C, 72 A, 88 R, 72 C, 95; *H02G 3/00, 3/04, 3/06; H01B 7/00, 7/08*
See application file for complete search history.

(56) References Cited

U.S. PATENT DOCUMENTS

| 3,088,055 | A | * | 4/1963 | Schwing | ....................... 361/826 |
| 3,485,937 | A | | 12/1969 | Caveney | |
| 3,761,603 | A | | 9/1973 | Hays et al. | |
| 3,786,171 | A | | 1/1974 | Shira | |
| 3,821,688 | A | | 6/1974 | Larsile | |
| 3,860,739 | A | | 1/1975 | Kloth et al. | |
| 3,890,459 | A | | 6/1975 | Caveney | |
| 3,968,322 | A | | 7/1976 | Taylor | |
| 4,108,523 | A | | 8/1978 | Bolis | |
| 4,156,795 | A | | 5/1979 | Lacan | |
| 4,255,610 | A | | 3/1981 | Textoris | |
| 4,534,147 | A | | 8/1985 | Cristell | |
| 4,629,826 | A | | 12/1986 | Thomas | |

(Continued)

FOREIGN PATENT DOCUMENTS
JP 200226532 1/2002

*Primary Examiner* — Quyen Leung
*Assistant Examiner* — Thomas Truong
(74) *Attorney, Agent, or Firm* — Robert A. McCann; Christopher S. Clancy; James H. Williams

(57) ABSTRACT

Certain embodiments of the present invention provide a DIN rail wiring duct. The DIN rail wiring duct has a top, a bottom, and a side. The DIN rail wiring duct includes a base. The base has a top wall, a bottom wall, a sidewall, and a divider wall, which define a channel and a channel opening for accessing the channel. The DIN rail wiring duct also includes a cover for the channel opening. The cover has a top wall and a sidewall substantially perpendicular to the top wall. The top wall of the cover is removably connected to the top wall of the base and the sidewall of the cover is rotatably connected to the sidewall of the base such that the channels are accessible through the channel openings from the top and the side of the DIN rail wiring duct when the cover is rotated from a closed position to an open position.

24 Claims, 21 Drawing Sheets

U.S. PATENT DOCUMENTS

| | | |
|---|---|---|
| 4,800,695 A | 1/1989 | Menchetti |
| 4,953,735 A | 9/1990 | Tisbo et al. |
| 5,089,667 A * | 2/1992 | Goussin et al. .............. 174/101 |
| 5,131,860 A | 7/1992 | Bogiel |
| 5,134,250 A | 7/1992 | Caveney et al. |
| 5,141,447 A | 8/1992 | Poirier |
| 5,299,947 A | 4/1994 | Barnard |
| 5,306,165 A | 4/1994 | Nadeau |
| 5,525,079 A | 6/1996 | Johnson |
| 5,730,400 A * | 3/1998 | Rinderer et al. ............ 248/68.1 |
| 5,802,672 A | 9/1998 | Rohder |
| 5,949,025 A * | 9/1999 | Nagai et al. .................. 174/101 |
| 5,950,974 A | 9/1999 | Hoffmann |
| 6,029,713 A * | 2/2000 | Miranda ....................... 138/162 |
| 6,107,575 A * | 8/2000 | Miranda ....................... 174/101 |
| 6,323,421 B1 * | 11/2001 | Pawson et al. ................ 174/503 |
| 6,350,135 B1 * | 2/2002 | Acklin et al. ................. 439/211 |
| 6,355,880 B1 * | 3/2002 | Bateson et al. ............... 174/502 |
| 6,437,243 B1 | 8/2002 | VanderVelde et al. |
| 6,437,244 B1 | 8/2002 | VanderVelde |
| 6,667,876 B1 * | 12/2003 | Neeff ............................ 361/601 |
| 6,803,519 B2 | 10/2004 | de la Borbolla et al. |
| 6,903,265 B1 | 6/2005 | VanderVelde et al. |
| 6,972,367 B2 | 12/2005 | Federspiel et al. |
| 7,059,898 B2 | 6/2006 | Barile |
| 7,210,961 B2 | 5/2007 | Berg |
| 7,829,797 B2 * | 11/2010 | VanderVelde et al. ........ 174/481 |
| 2006/0086530 A1 * | 4/2006 | Knabel ......................... 174/135 |
| 2008/0108248 A1 * | 5/2008 | Lim et al. ..................... 439/532 |
| 2009/0050345 A1 | 2/2009 | Delfosse et al. |

* cited by examiner

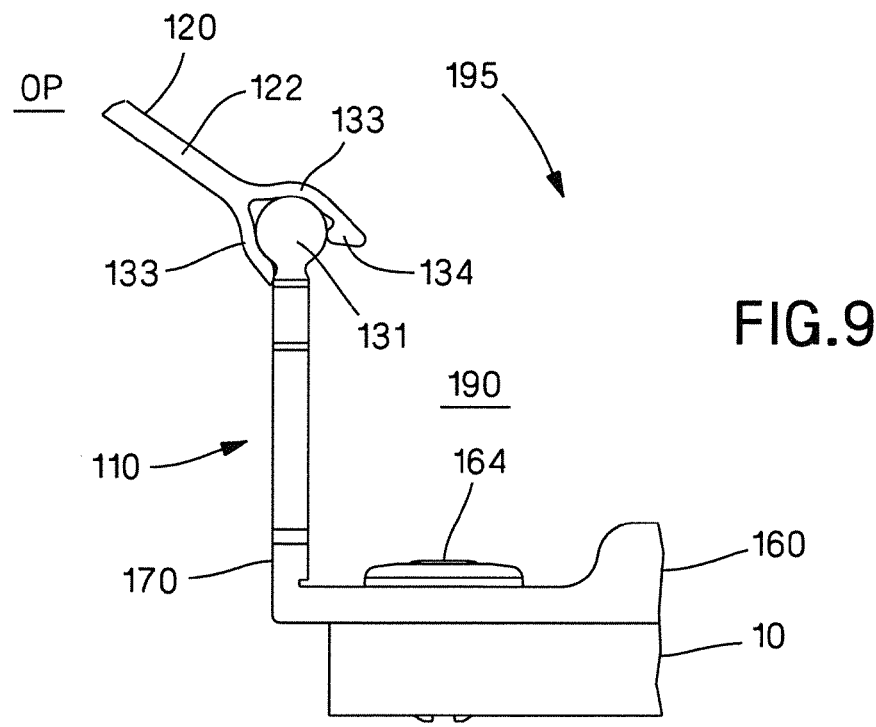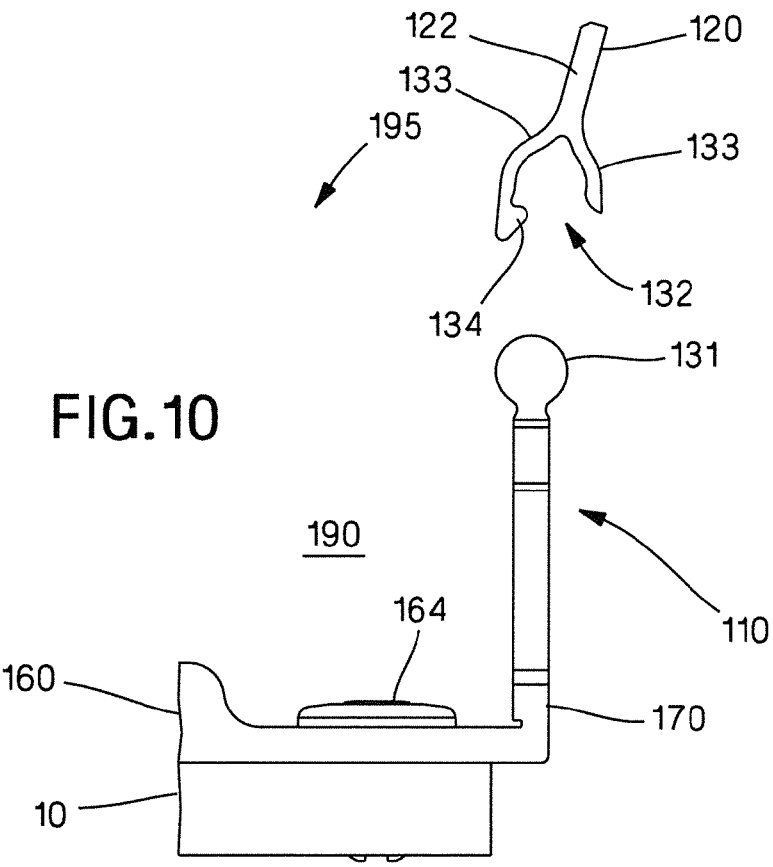

RAIL WIRING DUCT

CROSS-REFERENCE TO RELATED APPLICATIONS

This application claims priority to U.S. Provisional Application No. 61/027,965, filed Feb. 12, 2008.

BACKGROUND OF THE INVENTION

The present invention relates to an industrial enclosure, and more particularly, to a wiring duct for the industrial enclosure.

Typically, electronic components, such as cube relays, feed through terminal blocks, PLC interface modules, servo control breakout boards, circuit breaker terminal blocks, and/or fused terminal blocks, are mounted to a DIN rail, and in turn, the DIN rail is mounted to an industrial enclosure, such as a control panel, which protects the electronic components from the surrounding environment. Wiring ducts are disposed on either side of the DIN rail for routing cables to and from the electronic components.

While space is generally limited in the enclosure, as well as the surrounding environment, a sufficient amount of space must be provided for dissipating heat generated by the electronic components and for accessing the electronic components, as well as an interior portion of the wiring ducts. For example, the DIN rail may be mounted to the back of the enclosure. Typically, the wiring ducts are spaced apart from the electronic components by about 63.5 mm (2.5 inches). Alternatively, the DIN rail may be mounted to a DIN rail standoff, which elevates the DIN rail above the back of the enclosure by about 49.9 mm (1.96 inches). While the DIN rail standoff improves accessibility, the spacing remains unchanged.

Therefore, there is a need for a smaller, more compact wiring duct that provides enough space for dissipating heat generated by the electronic components and for accessing the electronic components, as well as the interior portion of the wiring duct.

SUMMARY OF THE INVENTION

Certain embodiments of the present invention provide a DIN rail wiring duct. The DIN rail wiring duct has a top, a bottom, and a side. The DIN rail wiring duct includes a base. The base has a top wall, a bottom wall, a sidewall, and a divider wall, which define a channel and a channel opening for accessing the channel. The DIN rail wiring duct also includes a cover for the channel opening. The cover has a top wall and a sidewall substantially perpendicular to the top wall. The top wall of the cover is removably connected to the top wall of the base and the sidewall of the cover is rotatably connected to the sidewall of the base such that the channels are accessible through the channel openings from the top and the side of the DIN rail wiring duct when the cover is rotated from a closed position to an open position.

BRIEF DESCRIPTION OF THE DRAWINGS

FIG. 9 is a partial enlargement of the hinge mechanism in the rail wiring duct of FIG. 1, showing a cover in an open position.

FIG. 10 is a partial enlargement of the hinge mechanism in the rail wiring duct of FIG. 1, showing a cover removed therefrom.

Figure 1:
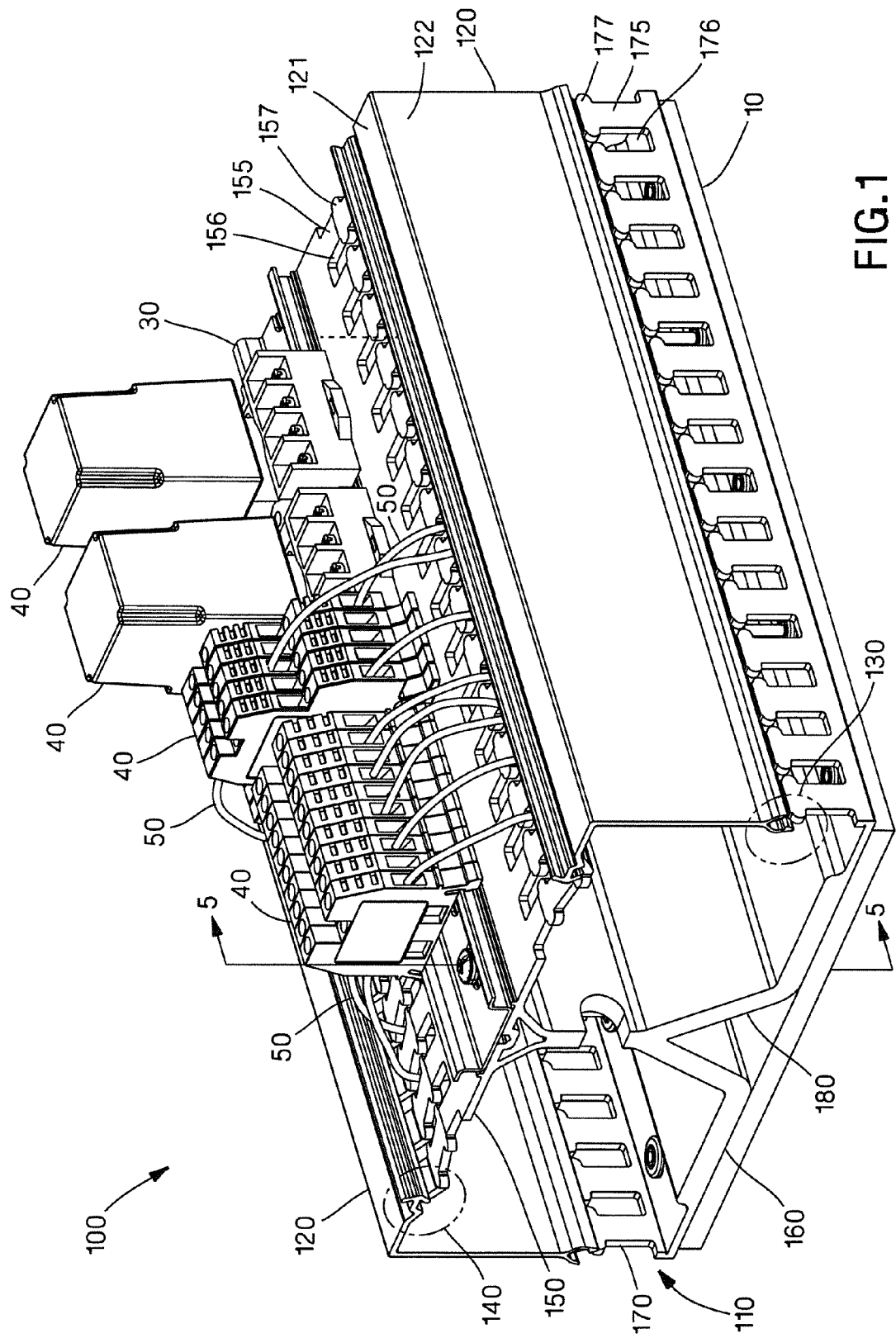
FIG. 1 is a top front perspective view of a rail wiring duct according to a first embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

FIGS. 1-10 illustrate a rail wiring duct 100 according to a first embodiment of the present invention. The rail wiring duct 100 includes a base 110 and two covers 120. Each of the covers 120 is attached to the base 110 by a hinge mechanism 130 on one side and a latch mechanism 140 on the other side. The rail wiring duct 100 may be formed from any suitable material, but is preferably formed from a plastic material, such as polyvinylchloride ("PVC"). The rail wiring duct 100 is preferably formed by extrusion followed by one or more secondary operations, such as punching of fingers and holes, as necessary.

As shown in FIG. 1, the rail wiring duct 100 is secured to a backplane 10 of an industrial enclosure (not shown). A DIN rail 30 is secured to the rail wiring duct 100, and DIN rail mounted components 40, such as cube relays, feed through terminal blocks, PLC interface modules, servo control breakout boards, circuit breaker terminal blocks, and/or fused terminal blocks, are secured to the DIN rail 30. Wires 50 connecting the DIN rail mounted components 40 are routed through the rail wiring duct 100. It is likewise contemplated that the rail wiring duct 100 may be installed in a variety of other environments.

Figure 3:
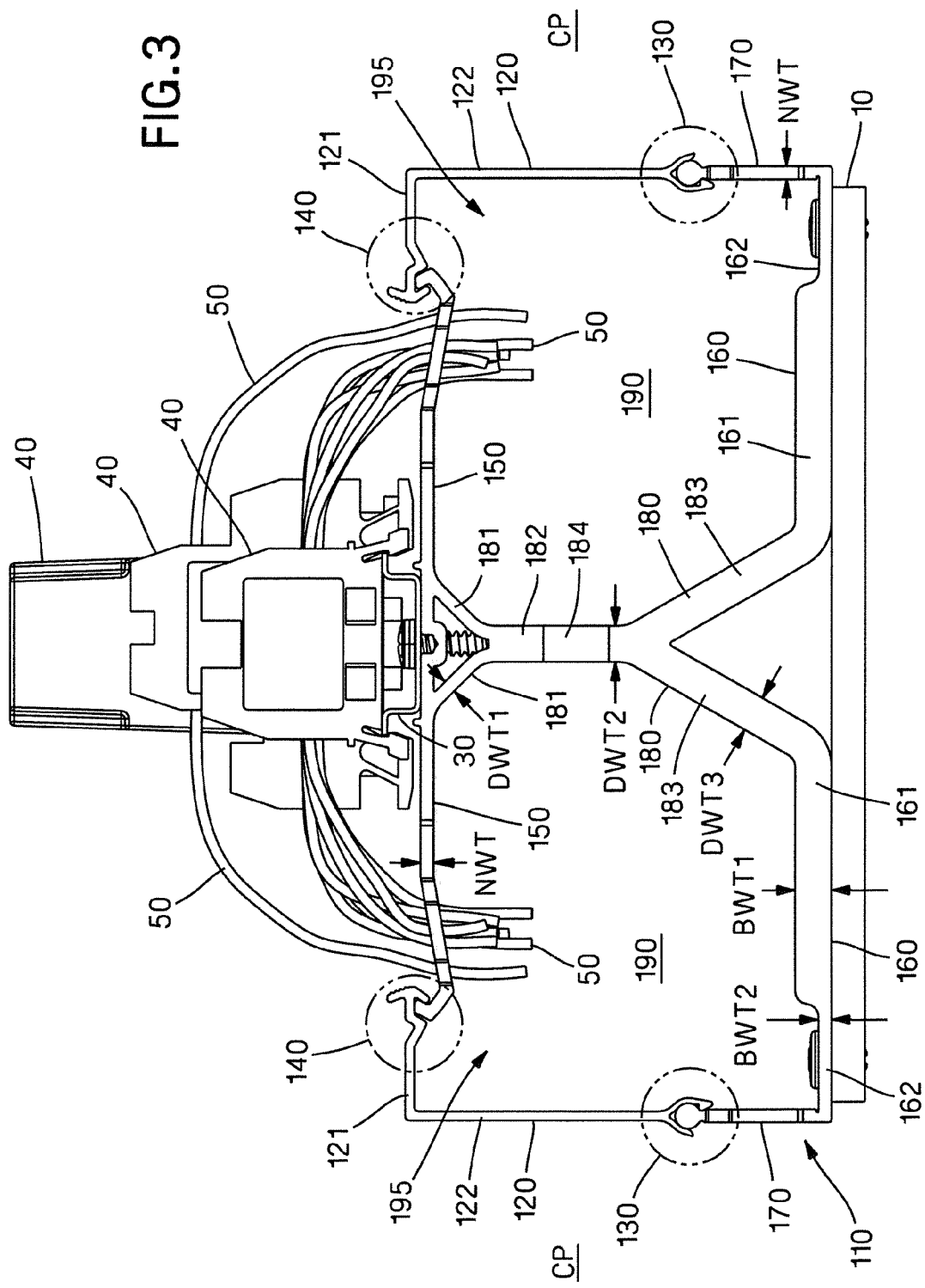
FIG. 3 is a front view of the rail wiring duct of FIG. 1, showing two covers in a closed position.

As best seen in FIG. 3, the base 110 includes a top wall 150, a bottom wall 160, two sidewalls 170, and a divider wall 180, which may be integrally formed or affixed together. The lop wall 150, the bottom wall 160, the sidewalls 170, and the divider wall 180 define two channels 190 and two channel openings 195 for accessing the channels 190. The channel openings 195 are accessible from both the top and the side of the rail wiring duct 100.

Figure 5:
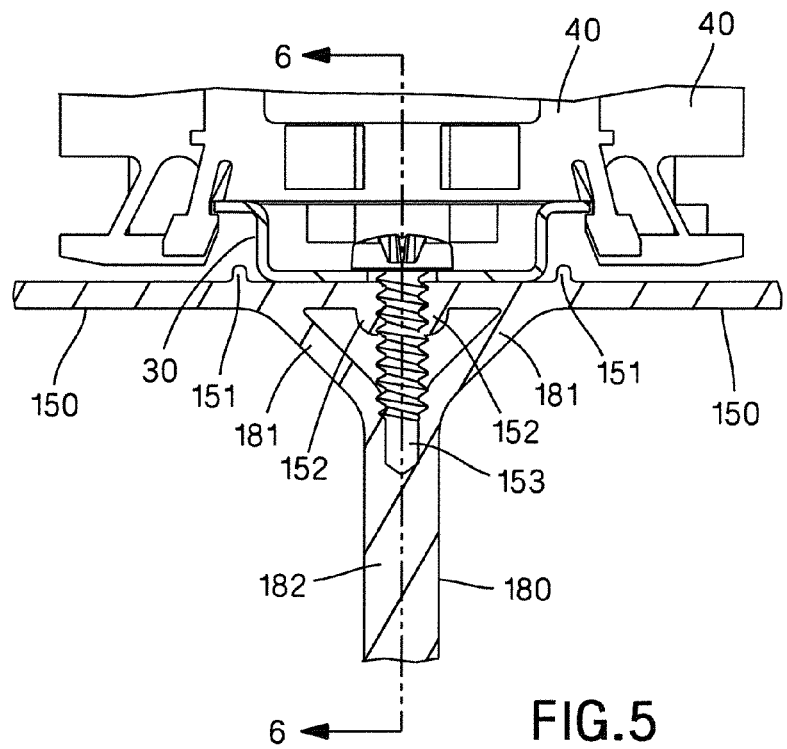
FIG. 5 is a cross-sectional view taken along lines 5-5 of FIG. 1.
Figure 4:
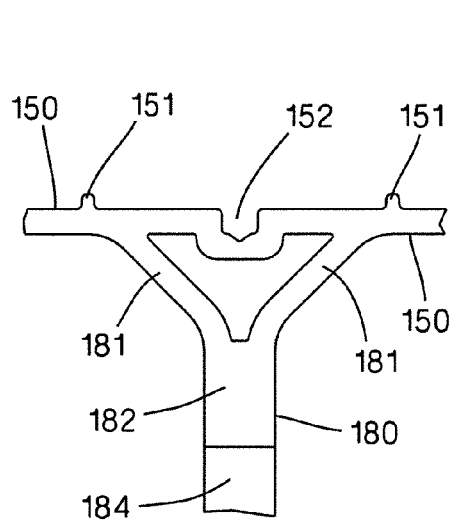
FIG. 4 is a partial enlargement of a mounting slot in the rail wiring duct of FIG. 1.
Figure 6:
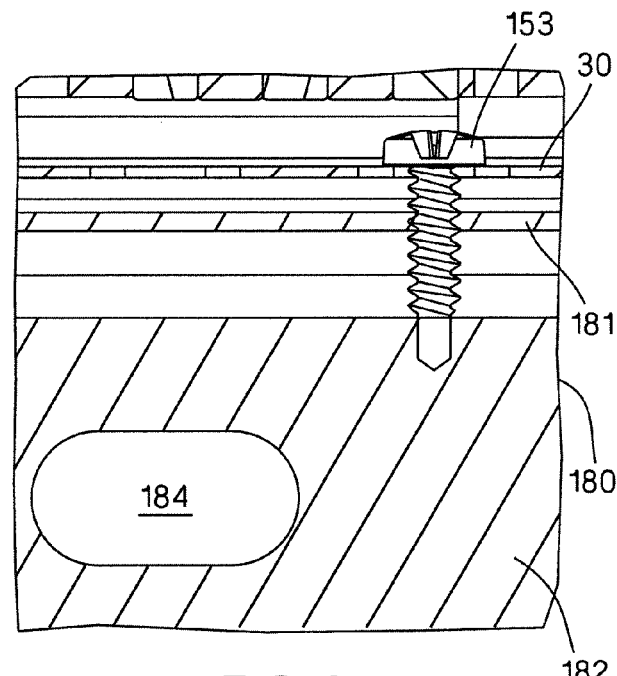
FIG. 6 is a cross-sectional view taken along lines 6-6 of FIG. 5.
Figure 12:
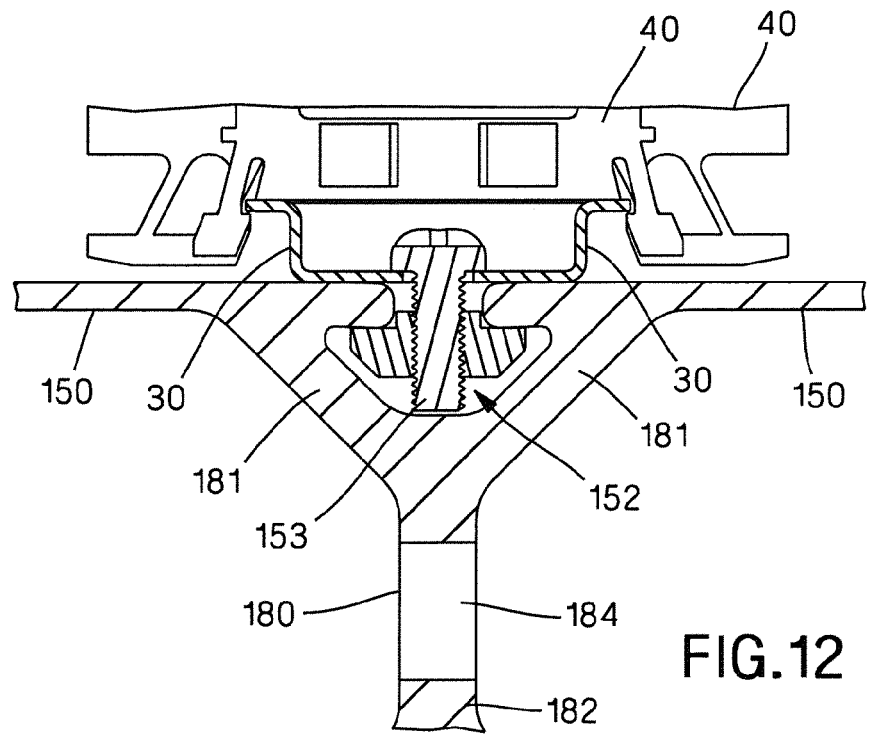
FIG. 12 is a cross-sectional view taken along lines 5-5 of FIG. 1, showing an alternative to the first embodiment of the present invention that utilizes the machine screw and the T-nut of FIG. 11.
Figure 11:
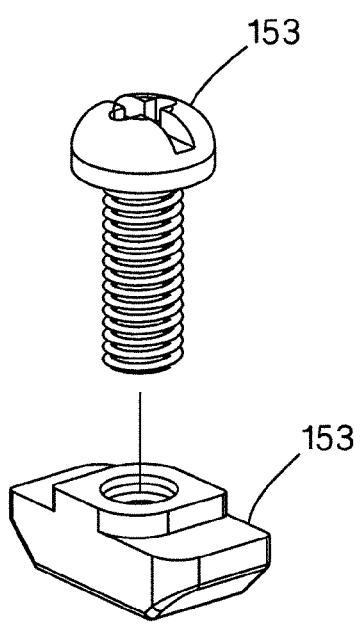
FIG. 11 is a top front perspective view of a machine screw and a T-nut.
Figure 13:
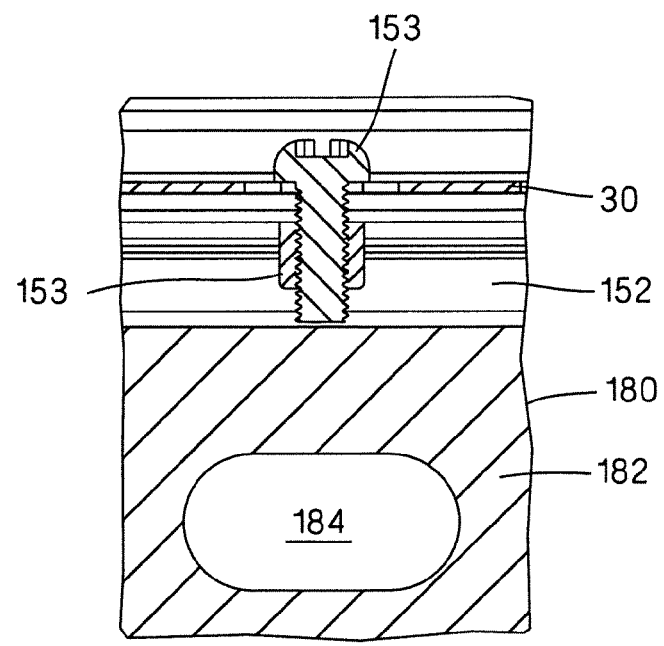
FIG. 13 is a cross-sectional view taken along lines 6-6 of FIG. 5, showing the alternative to the first embodiment of the present invention that utilizes the machine screw and the T-nut of FIG. 11.
Figure 14:
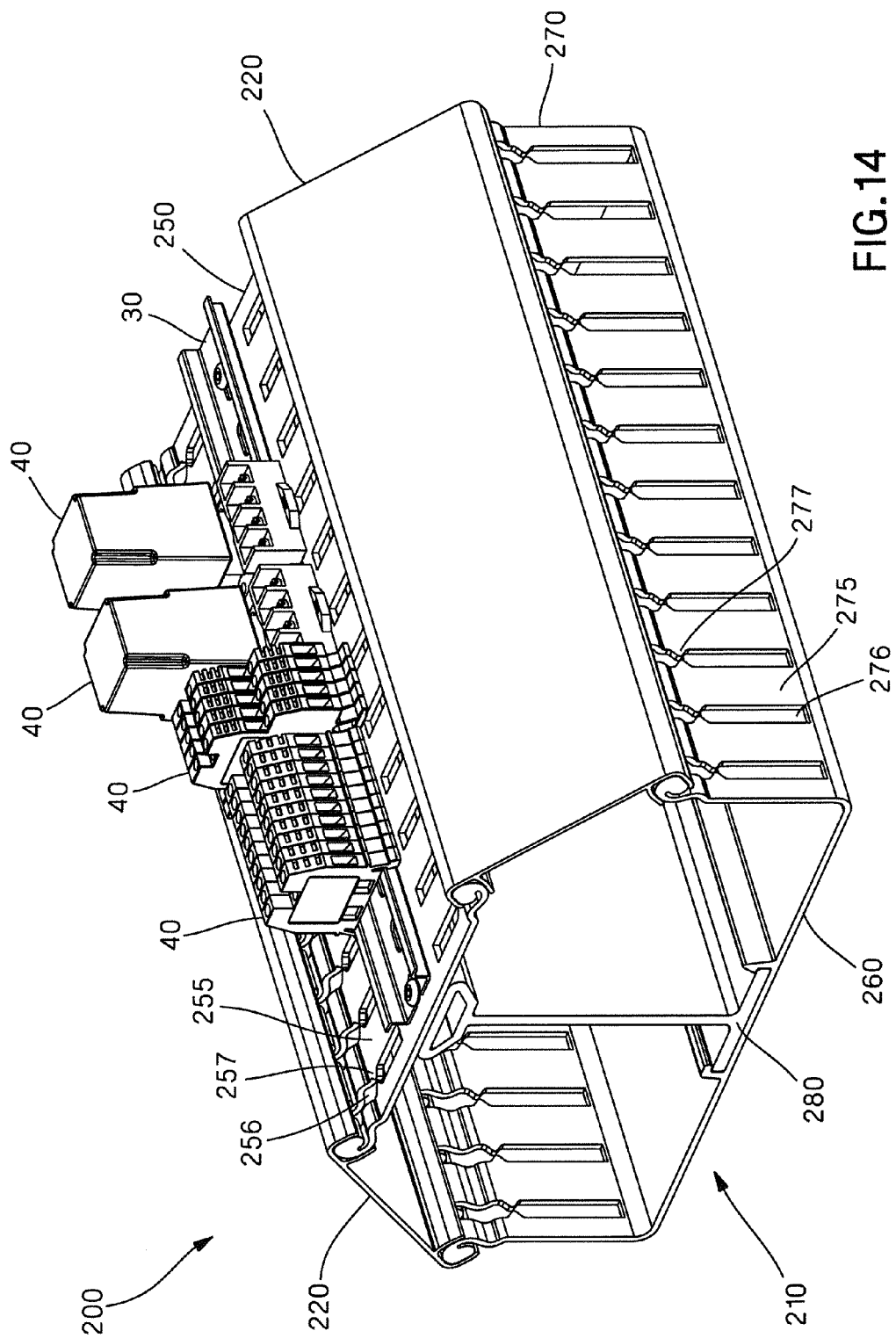
FIG. 14 is a top front perspective view of a rail wiring duct according to a second embodiment of the present invention.
Figure 15:
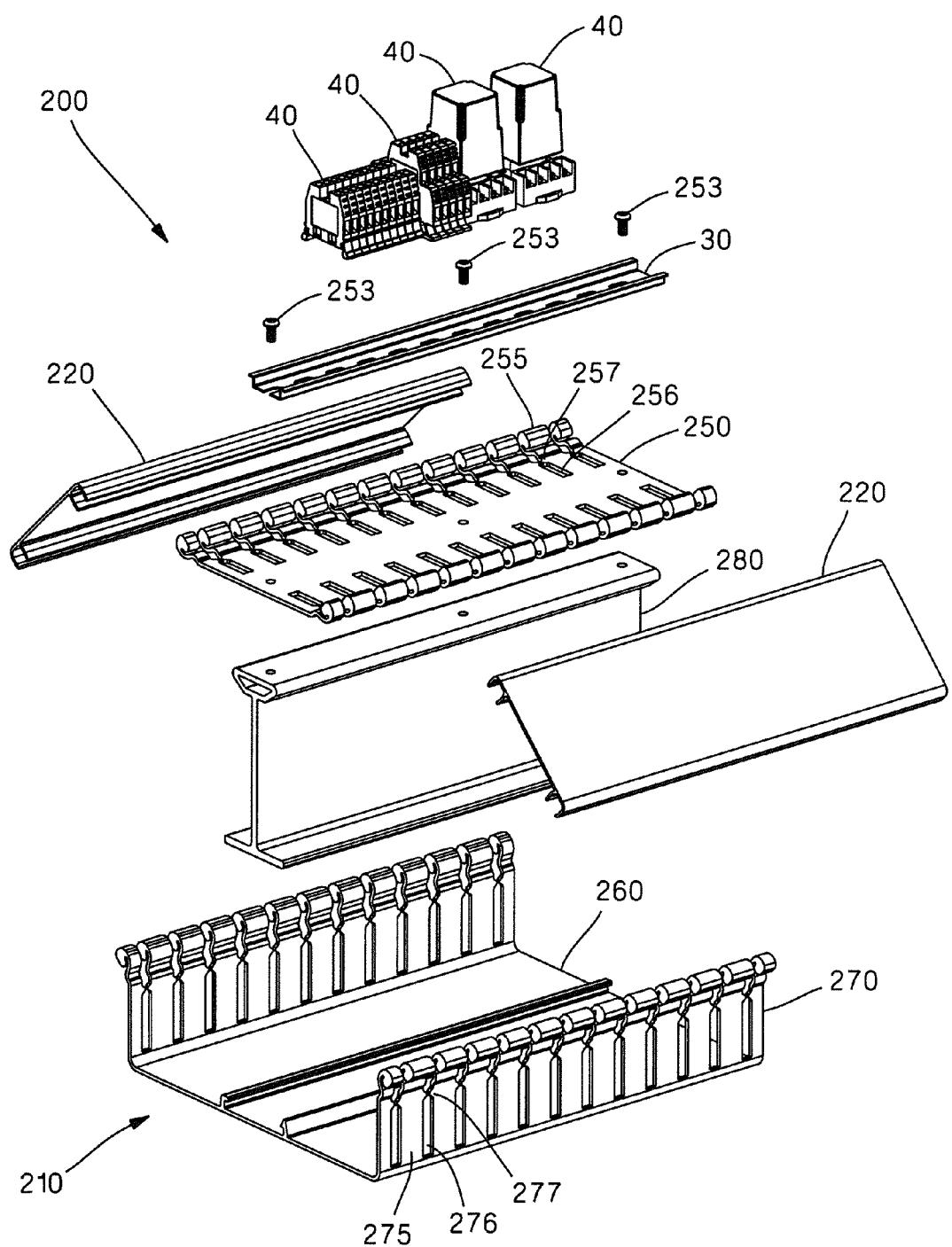
FIG. 15 is an exploded top front perspective view of the rail wiring duct of FIG. 14.

As best seen in FIG. 4, the top wall 150 of the base 110 includes a DIN rail mounting slot 152 and two DIN rail alignment ribs 151. The DIN rail 30 is positioned between the DIN rail alignment ribs 151 and secured to the top wall 150 using a plurality of fasteners 153, such as screws, as shown in FIGS. 4-6, and/or T-nuts, as shown in FIGS. 11-13. For example, the DIN rail 30 may be screwed directly into the DIN rail mounting slot 152, as shown in FIGS. 4-6. Alternatively, the DIN rail 30 may be screwed into T-nuts disposed in the DIN rail mounting slot 152, as shown in FIGS. 11-13.

As best seen in FIG. 3, the bottom wall 160 of the base 110 includes a first bottom wall section 161 and a second bottom wall section 162. The wall thickness of the bottom wall 160 may be varied to provide additional support for the DIN rail 30 and the DIN rail mounted components 40. For example, as shown in FIG. 3, the wall thickness BWT1 of the first bottom wall section 161 is greater than the wall thickness BWT2 of the second bottom wall section 162, as well as the nominal wall thickness NWT of the rail wiring duct 100. The second bottom wall section 162 includes a plurality of mounting holes 163 for attaching the rail wiring duct 100 to the backplane 10 of the industrial enclosure (not shown) using a plurality of fasteners 164, such as rivets, as best seen in FIG. 2.

As best seen in FIG. 3, the divider wall 180 includes a first divider wall section 181, a second divider wall section 182, and a third divider wall section 183. The shape and/or configuration of the divider wall 180 may be varied to provide additional support for the DIN rail 30 and the DIN rail mounted components 40. For example, as best seen in FIG. 3, the first divider wall section 181 and the third divider wall section 183 are substantially V-shaped, with the latter being inverted. The second divider wall section 182 is straight and bridges the first divider wall section 181 and the third divider wall section 183. Additionally, the wall thickness of the divider wall 180 may be varied to provide additional support for the DIN rail 30 and the DIN rail mounted components 40. For example, the wall thickness DWT2 of the second divider wall section 182 and the wall thickness DWT3 of the third divider wall section 183 are greater than the wall thickness DWT1 of the first divider wall section 181, as well as the nominal wall thickness NWT of the rail wiring duct 100. The second divider wall section 182 includes a plurality of through holes 184 for routing the wires 50 between the channels 190.

As shown in FIG. 3, each of the covers 120 is substantially L-shaped and includes a top wall 121 and a sidewall 122. The top wall 130 of the base 110 and the top walls 121 of the covers 120 collectively form a top wall of the rail wiring duct 100. Similarly, the sidewalls 170 of the base 110 and the sidewalls 122 of the covers 120 collectively form the sidewalls of the rail wiring duct 100. As described below in more detail, the top wall 121 of the cover 120 includes one or more components of the latch mechanism 140, and the sidewall 122 of the cover 120 includes one or more components of the hinge mechanism 130.

Figure 2:
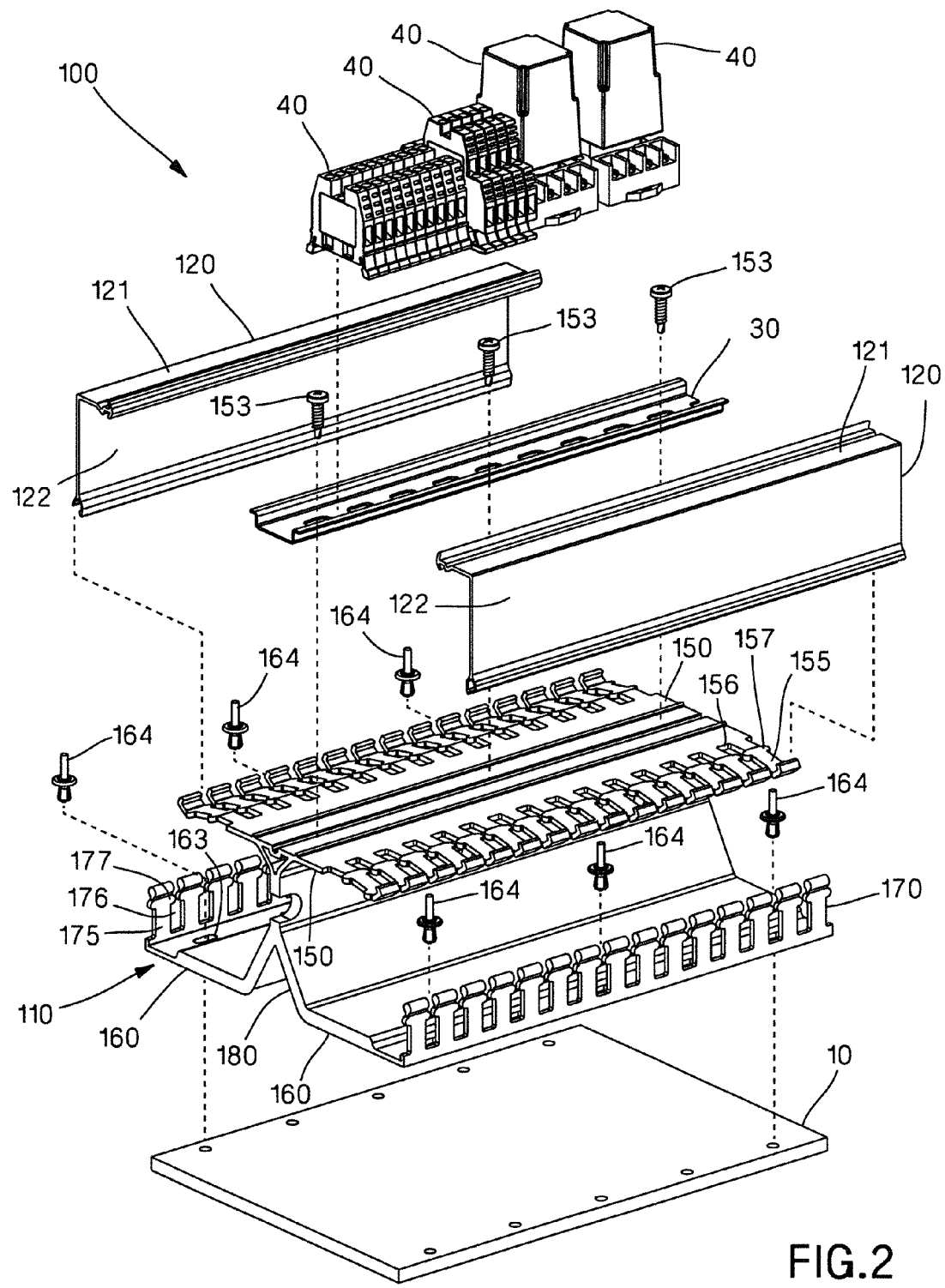
FIG. 2 is an exploded top front perspective view of the rail wiring duct of FIG. 1.

As shown in FIG. 2, the top wall 150 of the base 110 includes a plurality of top wall fingers 155. Similarly, the sidewalls 170 of the base 110 include a plurality of sidewall fingers 175. The fingers 155, 175 are separated by a plurality of slots 156, 176. Each of the fingers 155, 175 includes one or more pairs of ears 157, 177. The ears 157, 177 help to retain wires 50 in the slots 156, 176, particularly when the covers 120 are opened or removed. As described below in more detail, the top wall fingers 155 include one or more components of the latch mechanism 140 and the sidewall fingers 175 include one or more components of the hinge mechanism 130.

Figure 7:
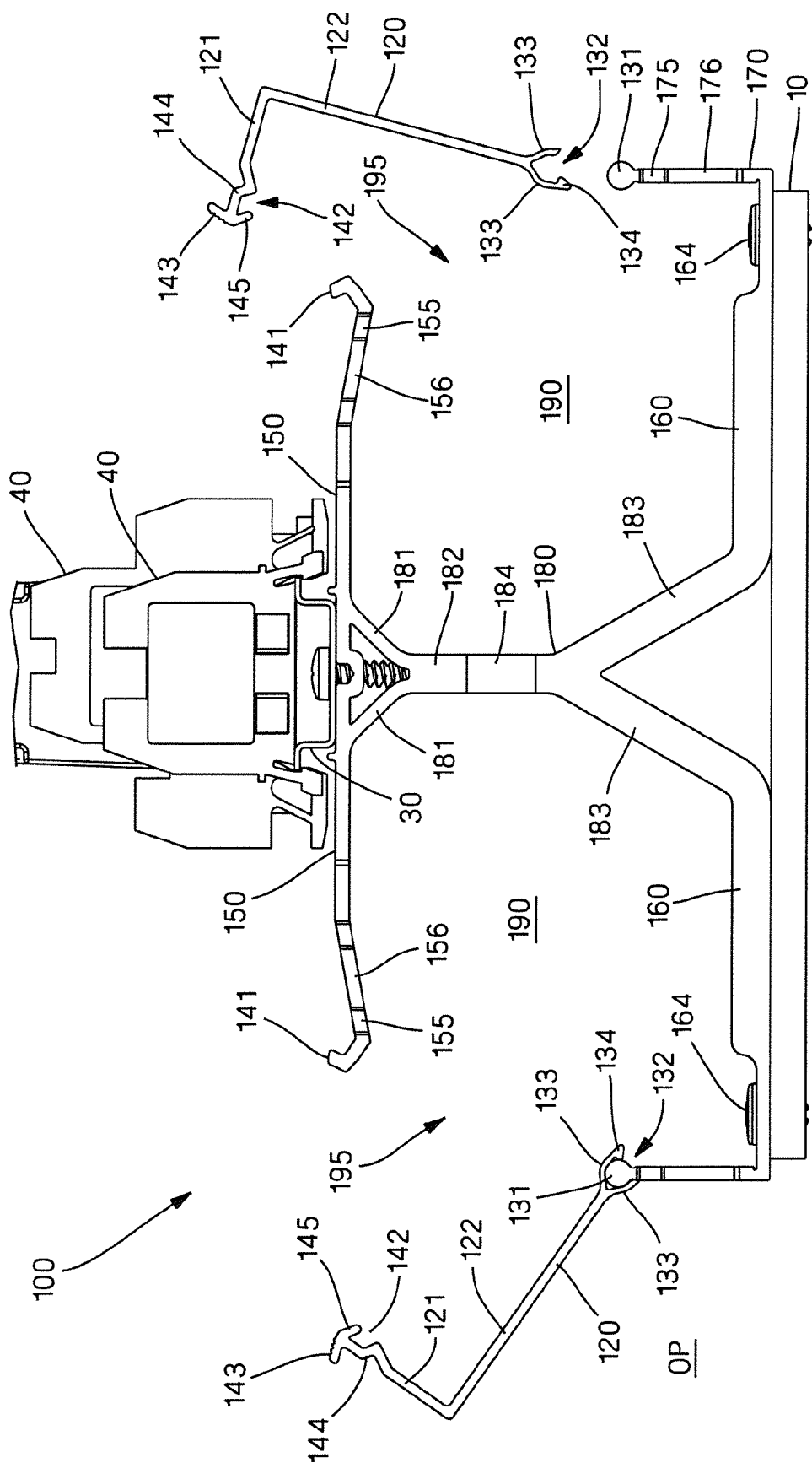
FIG. 7 is a front view of the rail wiring duct of FIG. 1, showing a first cover in an open position and a second cover removed therefrom.
Figure 8:
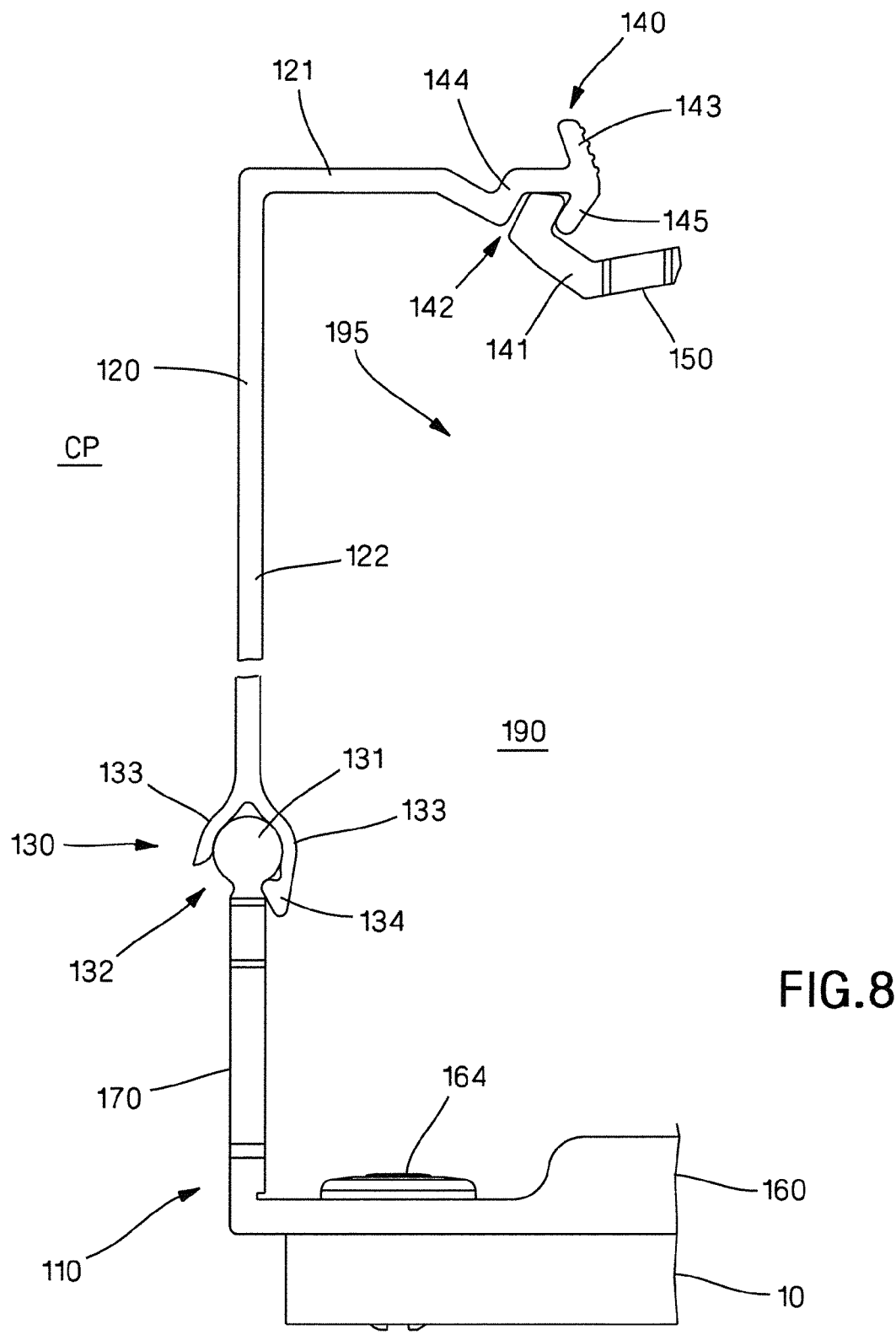
FIG. 8 is a partial enlargement of the rail wiring duct of FIG. 1, showing a hinge mechanism and a latch mechanism.

As shown in FIG. 8, the rail wiring duct 100 includes the hinge mechanism 130 and the latch mechanism 140. The hinge mechanism 130 connects the sidewall 122 of the cover 120 to the sidewall 170 of the base 110 and allows the cover 120 to rotate from a closed position CP, as shown in FIGS. 1, 3, and 8, to an open position OP, as shown in FIGS. 7 and 9. Additionally, the hinge mechanism 130 is separable and allows the cover 120 to be disconnected and removed from the base 110, as shown in FIGS. 7 and 10. The latch mechanism 140 connects the top wall 121 of the cover 120 to the top wall 150 of the base 110, and locks the cover 120 in the closed position CP.

As best seen in FIG. 8, the hinge mechanism 130 includes a ball 131 and a socket 132. The ball 131 is disposed on the base 110 of the rail wiring duct 100, at a distal end of each sidewall finger 175. The socket 132 is disposed on the cover 120 of the rail wiring duct 100, at a distal end of the cover sidewall 122. The socket 132 is formed by two socket arms 133. One of the socket arms 133 includes an undercut 134, which secures the ball 131 within the socket 132. As best seen in FIG. 9, the ball 131 is free to rotate within the socket 132. As best seen in FIG. 10. the socket arms 133 are resiliently deflectable, which allows the ball 131 to be inserted into or removed from the socket 132. Therefore, the base 110 and the cover 120 of the rail wiring duct 100 are rotatably and removably connected by the hinge mechanism 130.

Additionally, as best seen in FIG. 8, the latch mechanism 140 includes a latch arm 141, a latch pocket 142, and a release arm 143. The latch arm 141 is disposed on the base 110 of the rail wiring duct 100, at a distal end of each top wall finger 155. The latch pocket 142 and the release arm 143 are disposed on the cover 120 of the rail wiring duct 100, at a distal end of the cover top wall 121. The latch pocket 142 is formed by a pocket arm 144 and a portion 145 of the release arm 143. The latch arm 141 engages the latch pocket 142, locking the cover 120 in the closed position CP. When the release arm 143 is depressed, the latch arm 141 disengages from the latch pocket 142, unlocking the cover 120 and allowing the cover 120 to rotate from the closed position CP to the open position OP.

Figure 24:
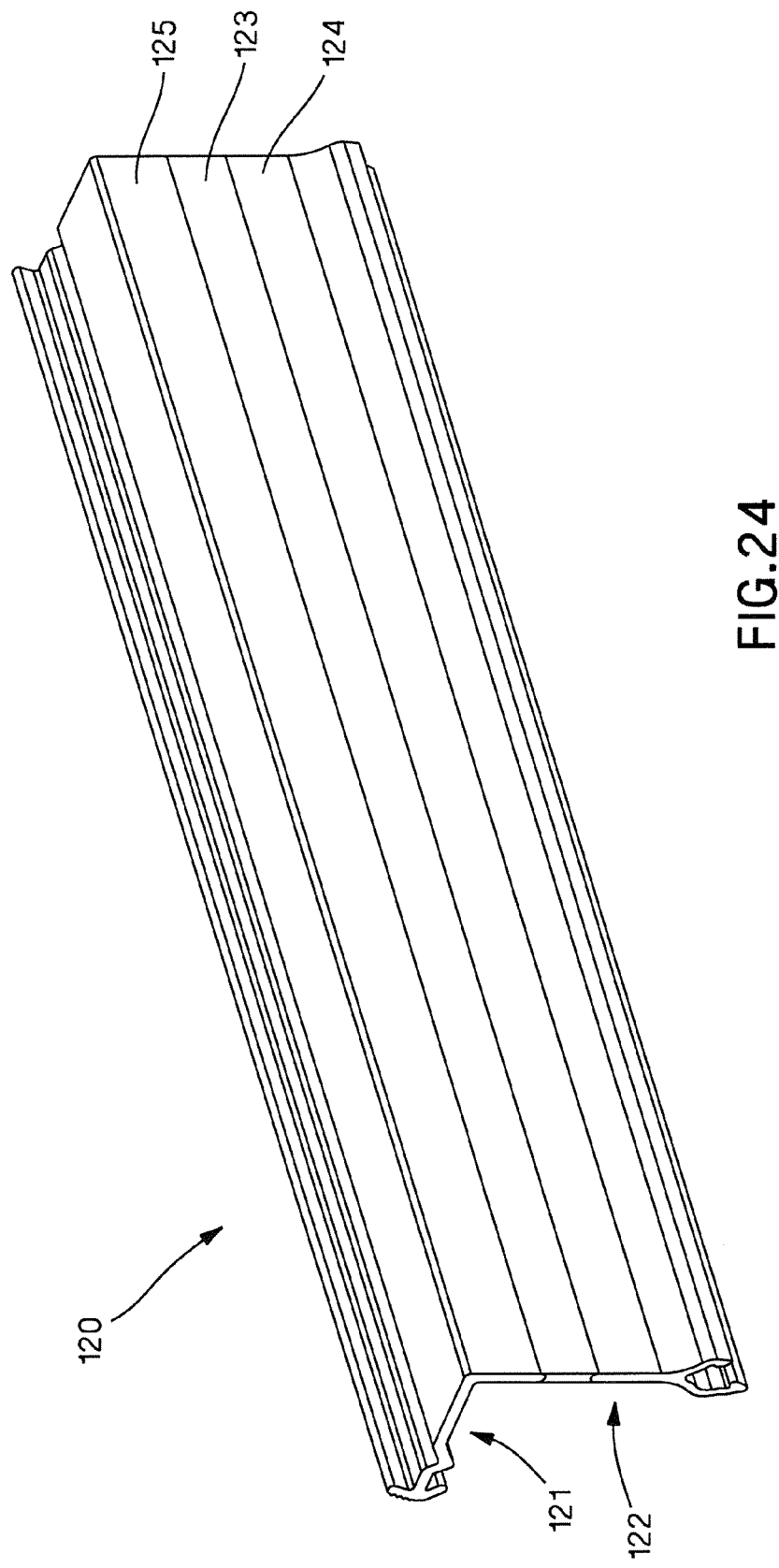
FIG. 24 illustrates a cover for the rail wiring duct of FIG. 1 according to an alternative embodiment of the present invention.
Figure 25:
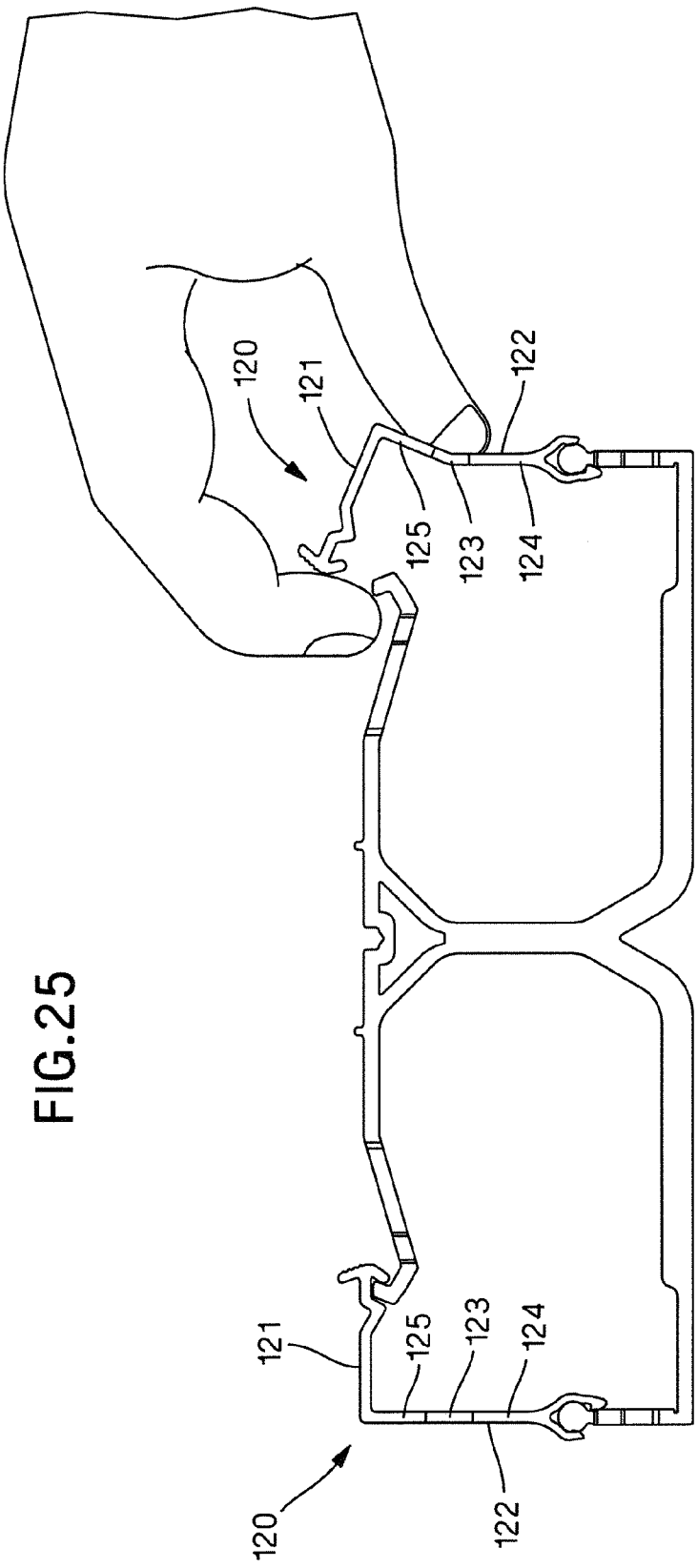
FIG. 25 is a side view of the cover of FIG. 24 on the rail wiring duct of FIG. 1, showing the cover being flexed and rotated from a closed position to an open position.
Figure 26:
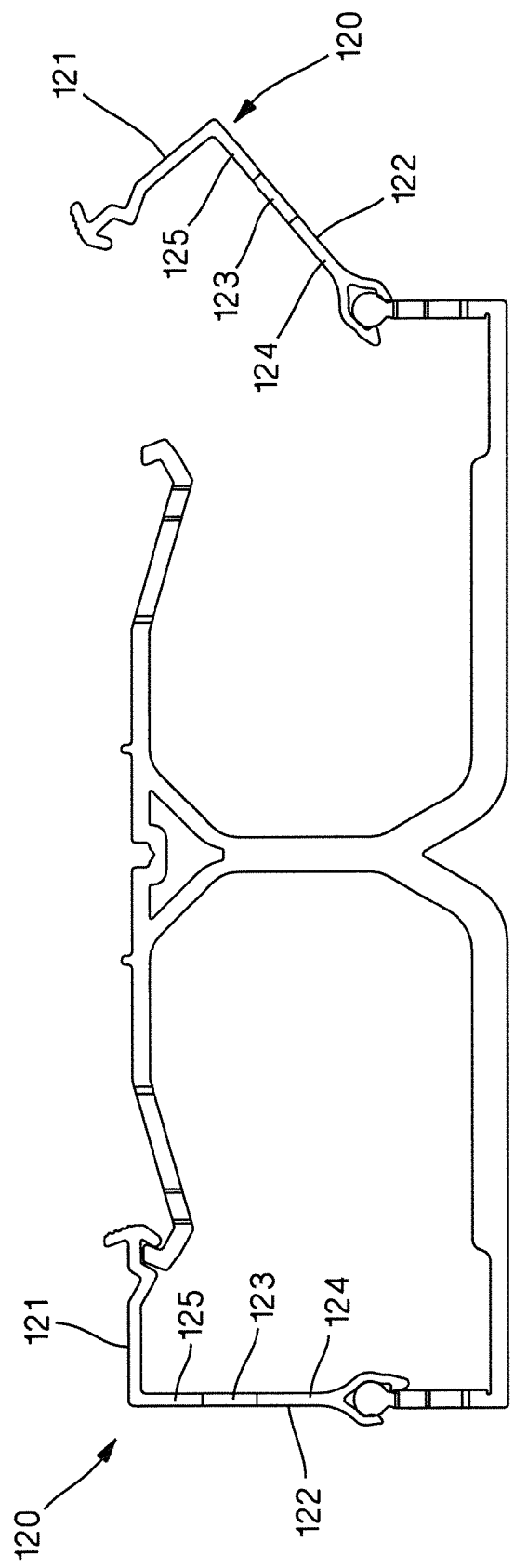
FIG. 26 is a side view of the cover of FIG. 24 on the rail wiring duct of FIG. 1, showing the cover in an open position.

In certain embodiments of the present invention, the cover 120 may include one or more flexible wall sections and one or more rigid or inflexible wall sections. For example, as best seen in FIG. 24, the sidewall 122 of the cover 120 includes a first wall section 123, a second wall section 124, and a third wall section 125. The first wall section 123 is disposed between the second wall section 124 and the third wall section 125. The first wall section 123 is relatively flexible compared to the second wall section 124 and the third wall section 125. Conversely, the second wall section 124 and the third wall section 125 are relatively rigid or inflexible compared to the first wall section 123. The top wall 121 of the cover 120 is also relatively rigid or inflexible compared to the first wall section 123. For example, the first wall section 123 may be made from flexible PVC, and the second wall section 124, the third wall section 125, and the top wall 121 may be made from rigid PVC. As shown in FIG. 25, the first or flexible wall section 123 allows the sidewall 122 of the cover 120 to bend or flex, making the latch mechanism 140 easier to disengage, and therefore, the cover 120 easier to open and/or remove. As shown in FIG. 26, the first or flexible wall section 123 is resilient. That is, the sidewall 122 of the cover 120 returns to its original form after being released.

FIGS. 14-18 illustrate a rail wiring duct 200 according to a second embodiment of the present invention. The rail wiring duct 200 is similar to the rail wiring duct 100 of FIG. 1, except that the rail wiring duct 200 includes an angled, dual hinge-cover 220 and a removable divider wall 280.

Figure 16:
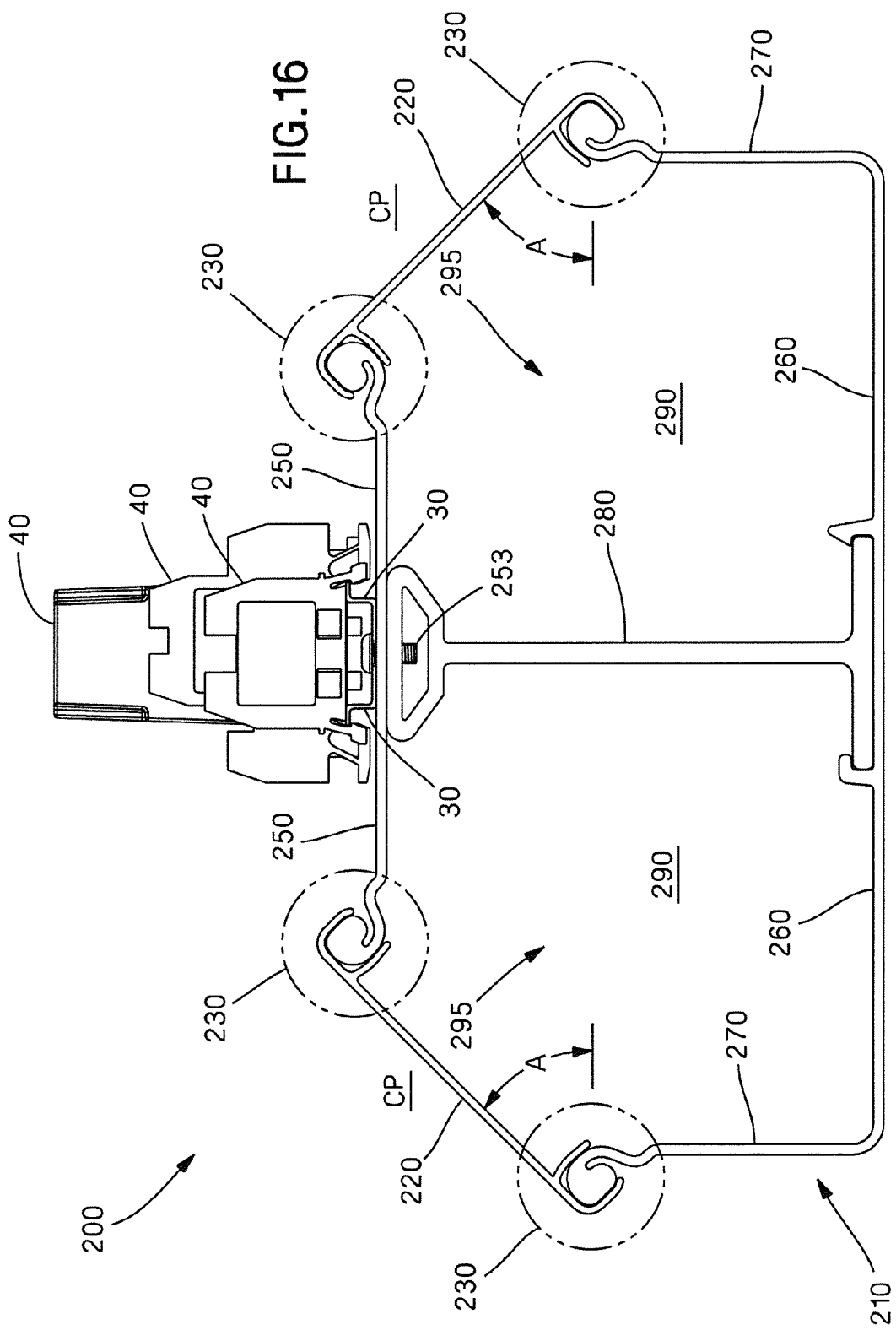
FIG. 16 is a front view of the rail wiring duct of FIG. 14. showing two covers in a closed position.

As best seen in FIG. 16, the cover 220 is oriented at an angle A of about 45 degrees with respect to the bottom wall 260 of the base 210. The angle A may be varied from about 0 degrees to about 90 degrees. Varying the angle A of the cover 220 changes the profile of the rail wiring duct 200, which may be advantageous in installations where space is limited.

Figure 17:
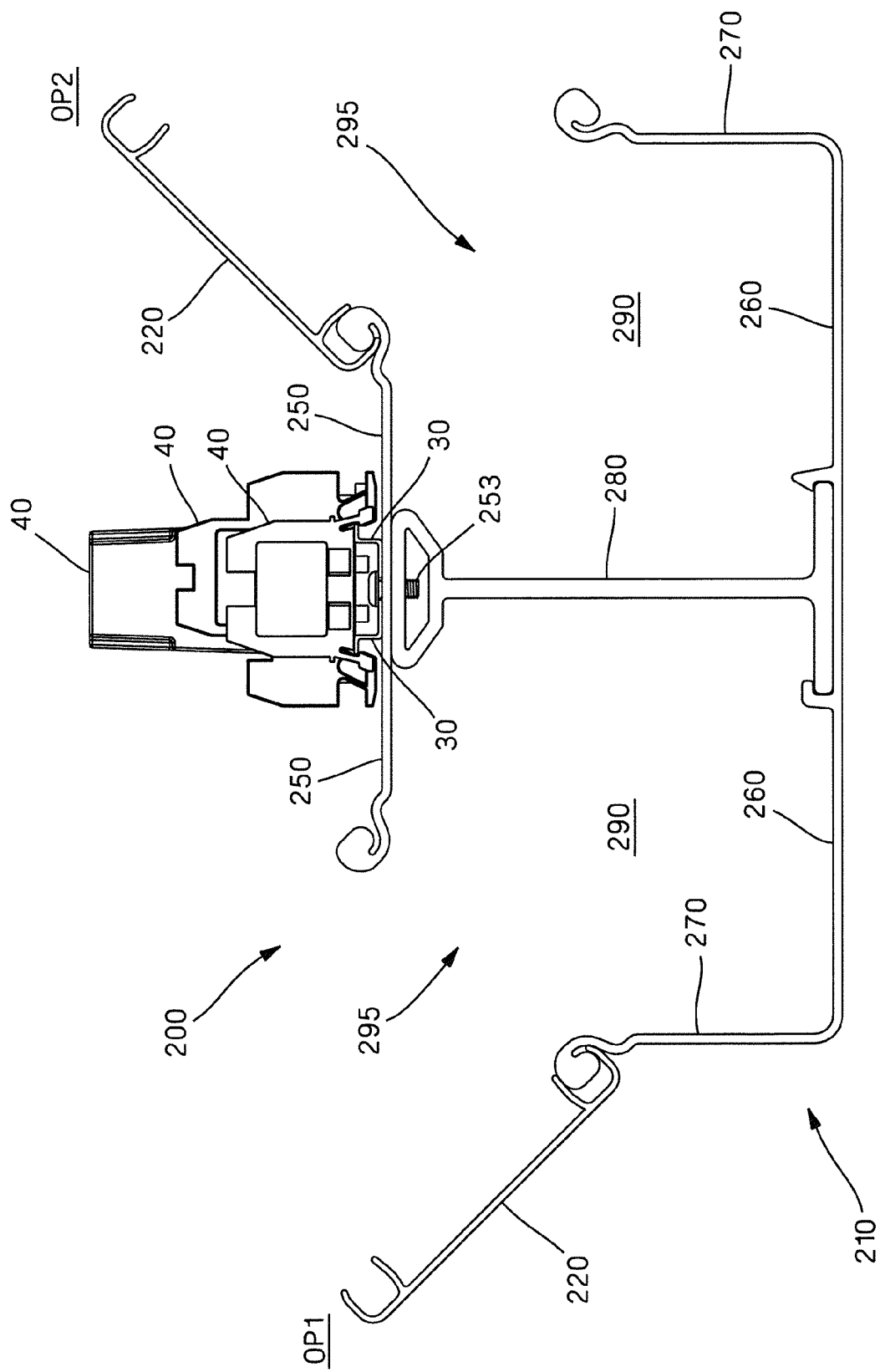
FIG. 17 is a front view of the rail wiring duct of FIG. 14, showing a first cover in a first open position and a second cover in a second open position.

As best seen in FIGS. 16-17, each of the covers 220 includes two hinge mechanisms 230, which allow the cover 220 to rotate from a closed position CP, as shown in FIG. 16, to one of two open positions OP1, OP2, as shown in FIG. 17. Additionally, the cover 220 is removable at one or both of the hinge mechanisms 230.

Figure 18:
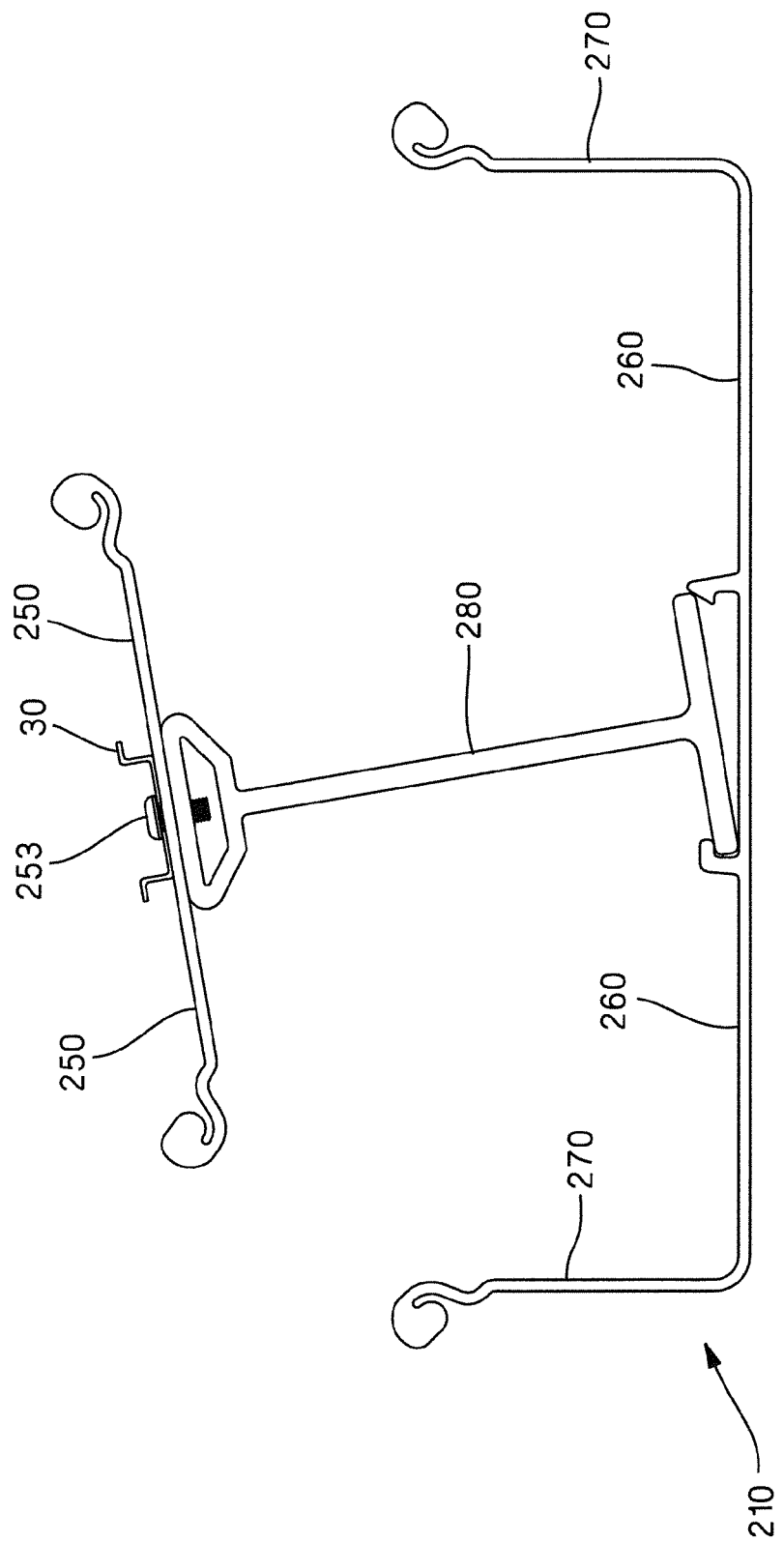
FIG. 18 is a front view of the rail wiring duct of FIG. 14, showing a top wall and a divider wall that are partially removed therefrom.
Figure 19:
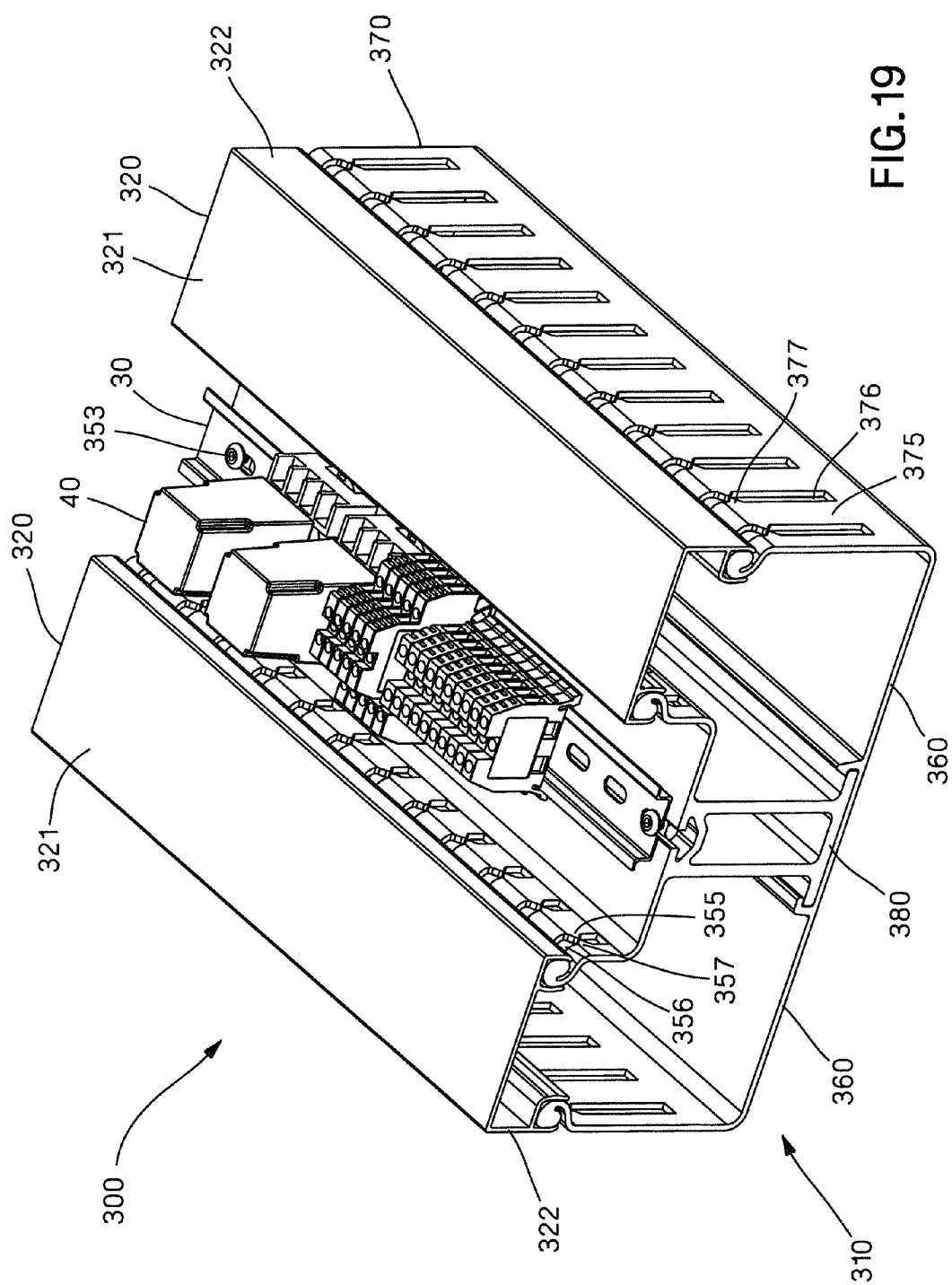
FIG. 19 is a top front perspective view of a rail wiring duct according to a third embodiment of the present invention.
Figure 20:
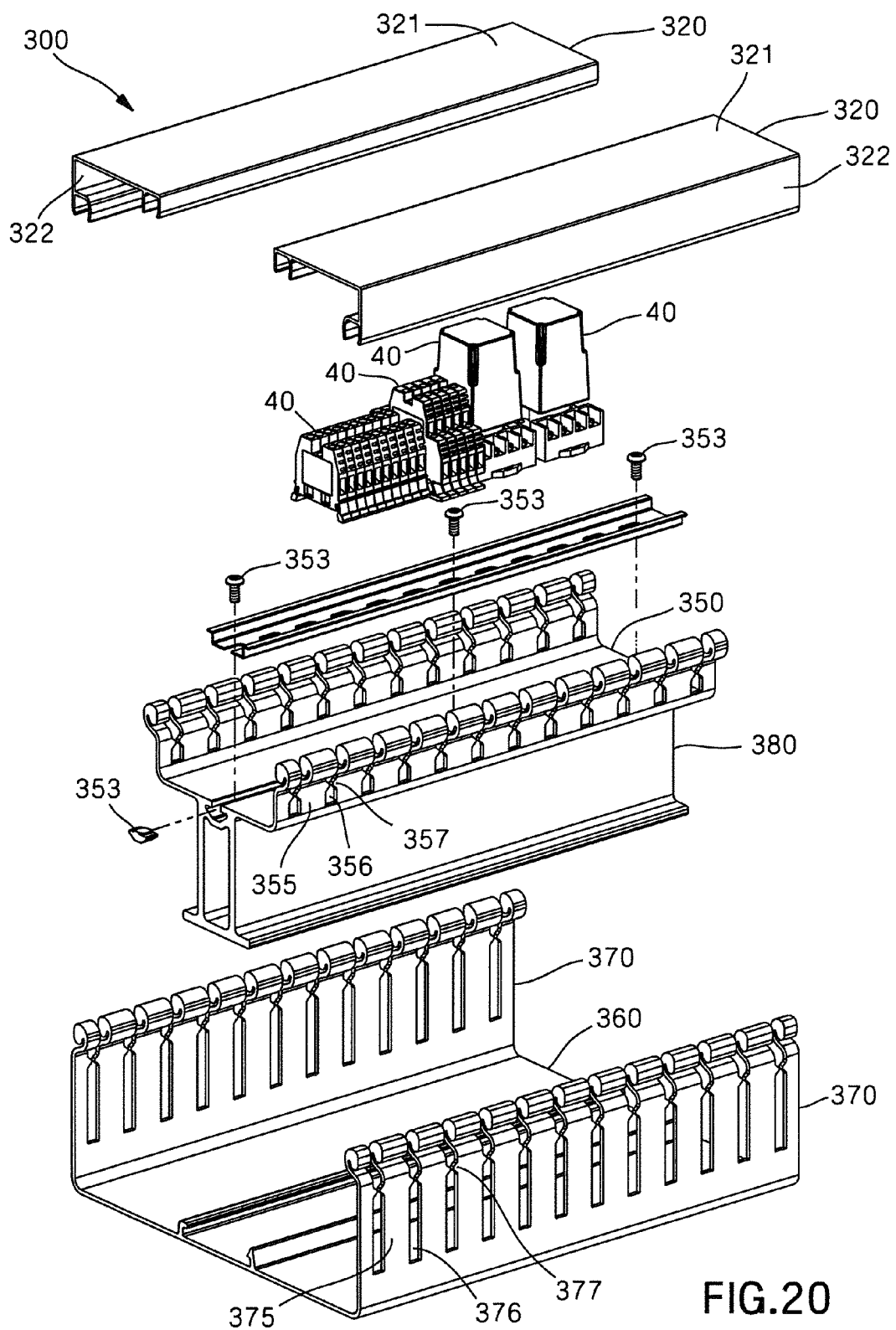
FIG. 20 is an exploded top front perspective view of the rail wiring duct of FIG. 19.

As best seen in FIG. 18, the top wall 250 and the divider wall 280 are removable from the base 210, which allows the top wall 250 and/or the divider wall 280 to be formed from a different material than the base 210. For example, the base 210 of the rail wiring duct 200, including the bottom wall 260 and the sidewalls 270, may be extruded from a plastic material, such as PVC, while the divider wall 280 is extruded from a metal, such as aluminum. One advantage of forming the divider wall 280 from a different material than the base 210 is to provide additional support for the DIN rail 30 and the DIM rail mounted components 40. Additionally, a top wall 250 and a divider wall 280 that are removable are easier to manufacture using existing punching technology.

FIGS. 19-23 illustrate a rail wiring duct 300 according to a third embodiment of the present invention. The rail wiring duct 300 is similar to the rail wiring duct 100 of FIGS. 1-13, except that the rail wiring duct 300 includes an elevated, dual-hinge cover 320 and an integrally formed, removable top wall 350 and divider wall 380.

Figure 21:
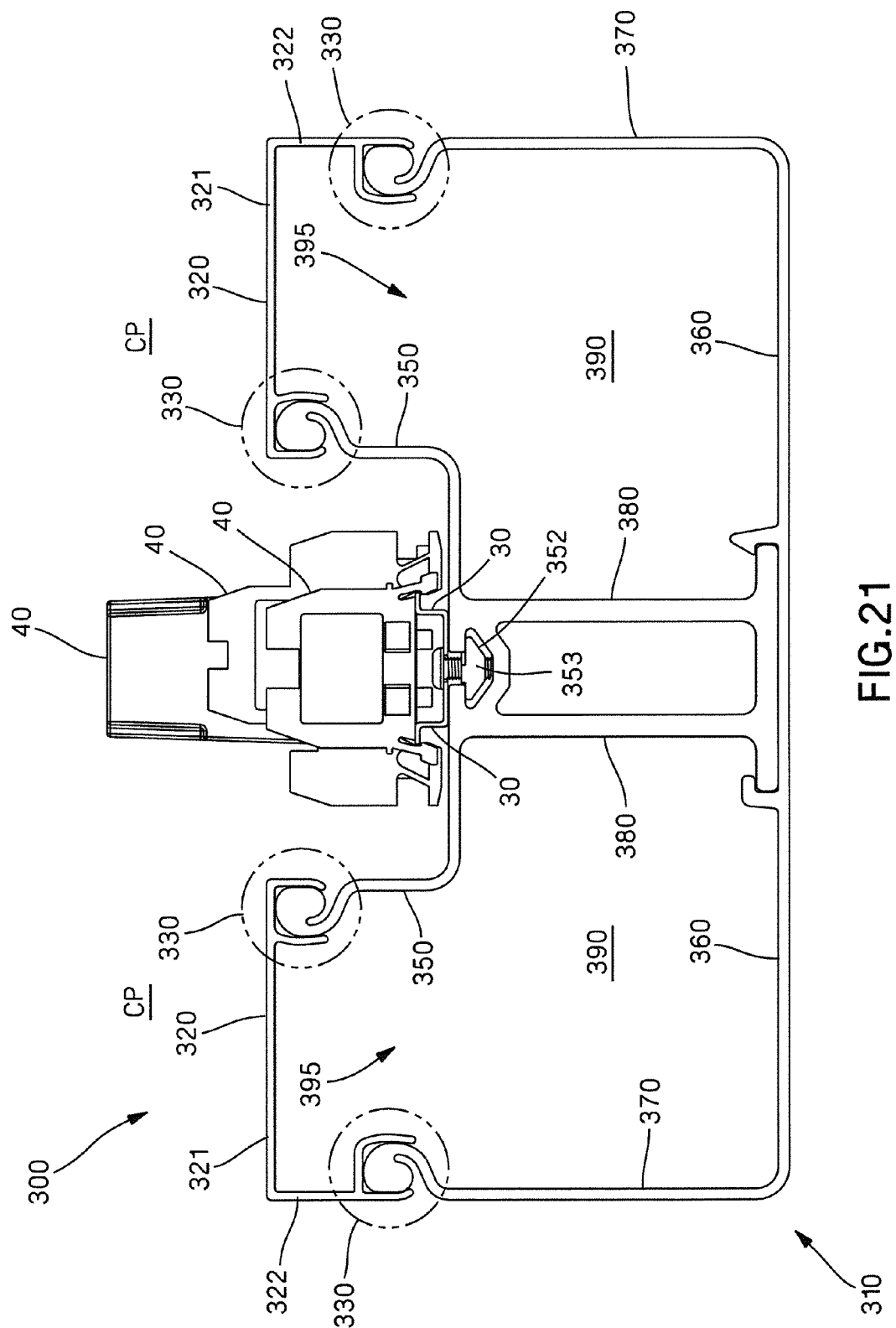
FIG. 21 is a front view of the rail wiring duct of FIG. 19, showing two covers in a closed position.

As best seen in FIG. 21, the top wall 350 of the base 310 is substantially U-shaped and includes top wall fingers 355. The top wall fingers 355 are substantially parallel to the sidewall fingers 375 and extend beyond the DIN rail 30. Consequently, the covers 320 are elevated with respect to the DIN rail 30. Compared to the rail wiring duct 100 of FIGS. 1-10, the sidewalls 322 of the cover 320 have been shortened and the sidewalls 370 of the base 310 have been lengthened, although other configurations are likewise contemplated. Additionally, similar to the sidewall fingers 375, the top wall fingers 355 are vertically oriented, and thus, easier to manufacture using existing punching technology.

Figure 22:
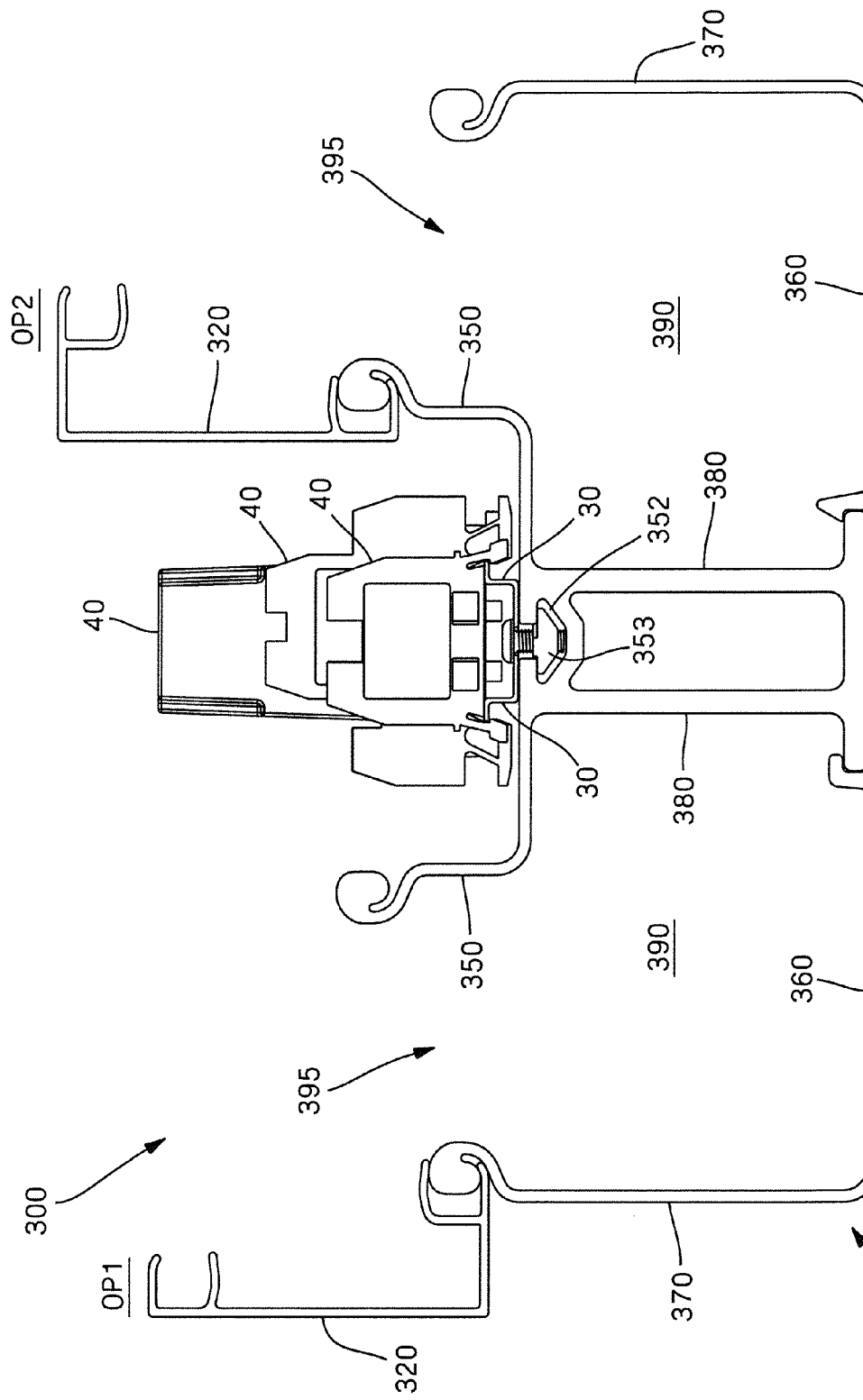
FIG. 22 is a front view of the rail wiring duct of FIG. 19, showing a first cover in a first open position and a second cover in a second open position.

As best seen in FIGS. 21-22, each of the covers 320 includes two hinge mechanisms 330, which allow the covers 320 to rotate from a closed position CP, as shown in FIG. 21, to one of two open positions OP1, OP2, as shown in FIG. 22. Additionally, the covers 320 are removable at one or both of the hinge mechanisms 330.

Figure 23:
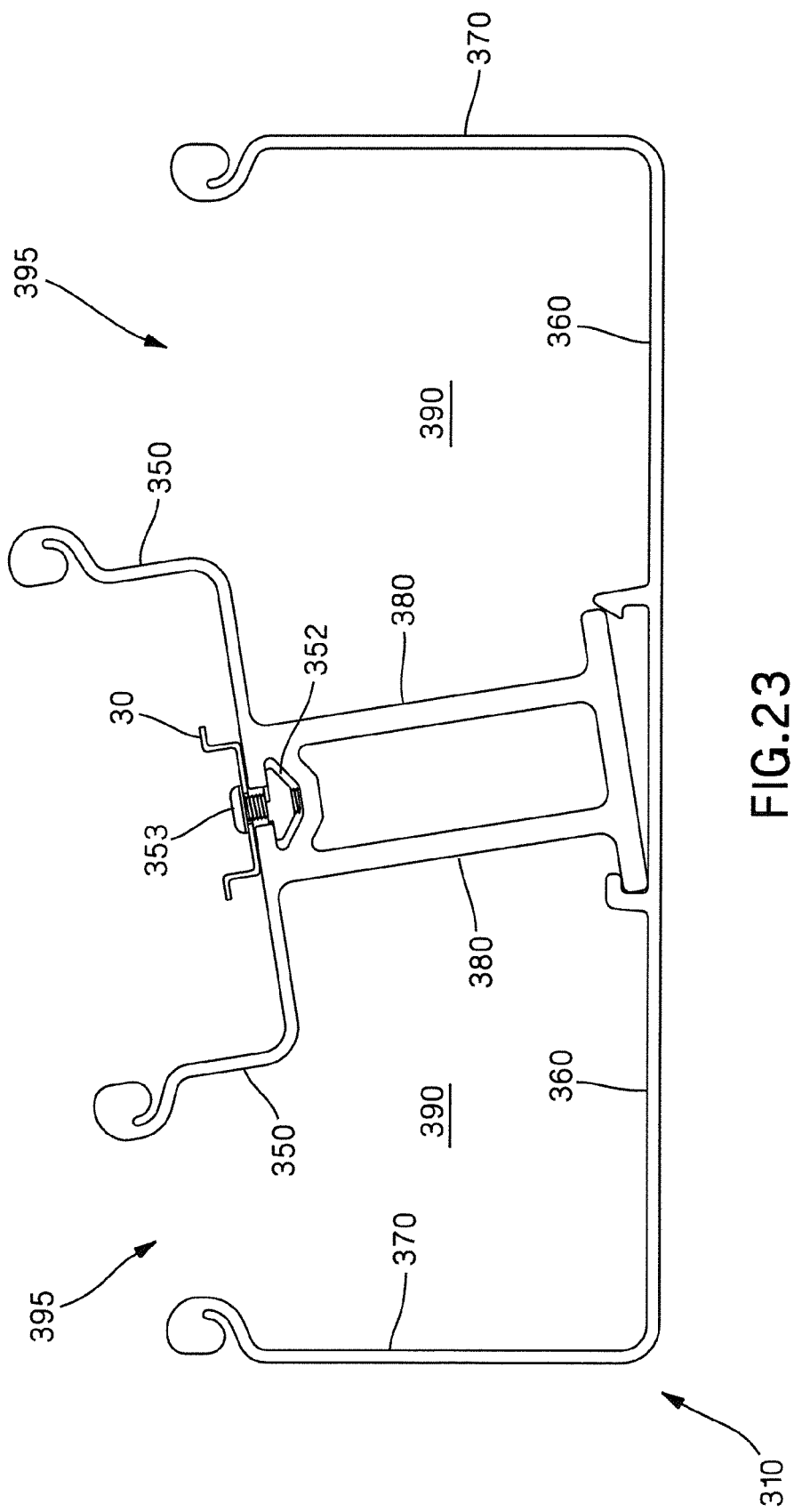
FIG. 23 is a front view of the rail wiring duct of FIG. 19, showing an integrally formed top wall and divider wall that is partially removed therefrom.

As best seen in FIG. 23, the top wall 350 and the divider wall 380 are integrally formed and removable from the base 310, which allows the top wall 350 and the divider wall 380 to be formed from a different material than the base 310. For example, the base 310 of the rail wiring duct 300, including the bottom wall 360 and the sidewalls 370, may be extruded from a plastic material, such as PVC, while the top wall 350 and the divider wall 380 may be extruded from a metal, such as aluminum. One advantage of forming the top wall 350 and the divider wall 380 from a different material than the base 310 is to provide additional support for the DIN rail 30 and the DIN rail mounted components 40. Additionally, a top wall 250 and a divider wall 280 that are integrally formed and removable is easier to manufacture using existing punching technology.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features that come within the spirit and scope of the invention.

The invention claimed is:

1. A DIN rail wiring duct having a top, a bottom, and a side, the DIN rail wiring duct comprising:
    a base having a top wall, a bottom wall, a sidewall, and a divider wall, the top wall, the bottom wall, the sidewall, and the divider wall defining a channel and a channel opening for accessing the channel; and
    a cover for the channel opening, the cover having a top wall and a sidewall substantially perpendicular to the top wall,
    wherein the top wall of the cover is removably connected to the top wall of the base and the sidewall of the cover is rotatably connected to the sidewall of the base such that the channels are accessible through the channel openings from the top and the side of the DIN rail wiring duct when the cover is rotated from a closed position to an open position,
    wherein the top wall of the base includes a plurality of fingers.

2. The DIN rail wiring duct of claim 1, wherein the sidewall of the cover is removably connected to the sidewall of the base such that the channels are accessible through the channel openings from the top and the side of the DIN rail wiring duct when the cover is removed from the DIN rail wiring duct.

3. The DIN rail wiring duct of claim 1, wherein each finger includes a pair of ears.

4. The DIN rail wiring duct of claim 1, wherein each finger includes a latch arm.

5. The DIN rail wiring duct of claim 1, wherein the sidewall of the base includes a plurality of fingers.

6. The DIN rail wiring duct of claim 1, wherein the top wall of the base includes a slot for mounting a DIN rail.

7. The DIN rail wiring duct of claim 6, wherein the divider wall is disposed below the slot to provide support for the DIN rail and any DIN rail mounted components.

8. The DIN rail wiring duct of claim 1, wherein the top wall of the base includes at least one rib for aligning a DIN rail.

9. The DIN rail wiring duct of claim 1, wherein a DIN rail is removably connected to the top wall of the base.

10. The DIN rail wiring duct of claim 1, wherein the bottom wall of the DIN rail wiring duct is removably connected to a backplane.

11. The DIN rail wiring duct of claim 1, wherein the top wall of the base and the top wall of the cover collectively form the top of the DIN rail wiring duct.

12. The DIN rail wiring duct of claim 1, wherein the sidewall of the base and the sidewall of the cover collectively form the side of the DIN rail wiring duct.

13. The DIN rail wiring duct of claim 1, wherein the divider wall includes a first wall section and a second wall section, the first wall section being thicker than the second wall section.

14. The DIN rail wiring duct of claim 13, wherein the first wall section is adjacent the bottom wall of the base.

15. The DIN rail wiring duct of claim 1, wherein the bottom wall of the base includes a first wall section and a second wall section, the first wall section being thicker than the second wall section.

16. The DIN rail wiring duct of claim 15, wherein the first wall section is adjacent the divider wall of the base.

17. A DIN rail wiring duct having a top, a bottom, and a side, the DIN rail wiring duct comprising:
   a base having a top wall, a bottom wall, a sidewall, and a divider wall, the top wall, the bottom wall, the sidewall, and the divider wall defining a channel and a channel opening for accessing the channel; and
   a cover for the channel opening, the cover having a top wall and a sidewall substantially perpendicular to the top wall,
   wherein the top wall of the cover is removably connected to the top wall of the base and the sidewall of the cover is rotatably connected to the sidewall of the base such that the channels are accessible through the channel openings from the top and the side of the DIN rail wiring duct when the cover is rotated from a closed position to an open position,
   wherein the sidewall of the base includes a plurality of fingers,
   wherein each finger includes a ball.

18. The DIN rail wiring duct of claim 17, wherein the sidewall of the cover includes a socket for receiving the ball.

19. The DIN rail wiring duct of claim 18, wherein the socket is deflectable such that the ball is removable therefrom.

20. A DIN rail wiring duct having a top, a bottom, and a side, the DIN rail wiring duct comprising:
   a base having a top wall, a bottom wall, a sidewall, and a divider wall, the top wall, the bottom wall, the sidewall, and the divider wall defining a channel and a channel opening for accessing the channel; and
   a cover for the channel opening, the cover having a top wall and a sidewall substantially perpendicular to the top wall,
   wherein the top wall of the cover is removably connected to the top wall of the base and the sidewall of the cover is rotatably connected to the sidewall of the base such that the channels are accessible through the channel openings from the top and the side of the DIN rail wiring duct when the cover is rotated from a closed position to an open position,
   wherein the top wall of the base includes a plurality of fingers,
   wherein each finger includes a latch arm,
   wherein the top wall of the cover includes a latch pocket for receiving the latch arm.

21. The DIN rail wiring duct of claim 20, wherein the top wall of the cover includes a release arm for disengaging the latch arm from the latch pocket.

22. A DIN rail wiring duct having a top, a bottom, and a side, the DIN rail wiring duct comprising:
   a base having a top wall, a bottom wall, a sidewall, and a divider wall, the top wall, the bottom wall, the sidewall, and the divider wall defining a channel and a channel opening for accessing the channel; and
   a cover for the channel opening, the cover having a top wall and a sidewall substantially perpendicular to the top wall,
   wherein the top wall of the cover is removably connected to the top wall of the base and the sidewall of the cover is rotatably connected to the sidewall of the base such that the channels are accessible through the channel openings from the top and the side of the DIN rail wiring duct when the cover is rotated from a closed position to an open position,
   wherein the sidewall of the cover includes a first wall section and a second wall section, the first wall section being more flexible than the second wall section.

23. The DIN rail wiring duct of claim 22, wherein the first wall section includes flexible polyvinylchloride and the second wall section includes rigid polyvinylchloride.

24. A DIN rail wiring duct having a top, a bottom, and a side, the DIN rail wiring duct comprising:
   a base having a top wall, a bottom wall, a sidewall, and a divider wall, the top wall, the bottom wall, the sidewall, and the divider wall defining a channel and a channel opening for accessing the channel; and
   a cover for the channel opening, the cover having a top wall and a sidewall substantially perpendicular to the top wall,
   wherein the top wall of the cover is removably connected to the top wall of the base and the sidewall of the cover is rotatably connected to the sidewall of the base such that the channels are accessible through the channel openings from the top and the side of the DIN rail wiring duct when the cover is rotated from a closed position to an open position,
   wherein the sidewall of the base includes a plurality of fingers,
   wherein each finger includes a pair of ears.

* * * * *